United States Patent [19]
Moser et al.

[11] Patent Number: 5,340,547
[45] Date of Patent: Aug. 23, 1994

[54] CLEAR LIQUOR SCRUBBING MAGNESIUM-ENHANCED LIME FLUE GAS DESULFURIZATION SYSTEM

[75] Inventors: Robert E. Moser, Palo Alto, Calif.; James H. Wilhelm, Sandy, Utah; John Burke, Chamblee, Ga.; Sterling Gray, Louisville, Ky.

[73] Assignee: Electric Power Research Institute, Palo Alto, Calif.

[21] Appl. No.: 986,068

[22] Filed: Jan. 19, 1993

Related U.S. Application Data

[62] Division of Ser. No. 796,613, Nov. 22, 1991, Pat. No. 5,213,782.

[51] Int. Cl.5 .......... G05D 7/00; B01D 53/34; F01N 3/00
[52] U.S. Cl. .................. 422/177; 422/168; 422/111; 422/105
[58] Field of Search ............. 422/105, 110, 111, 177, 422/168; 423/243.1, 243.08, 243.11

[56] References Cited

U.S. PATENT DOCUMENTS

| | | | |
|---|---|---|---|
| 3,873,275 | 3/1975 | Bennett | 422/252 |
| 3,914,378 | 10/1975 | Selmeczi | 423/243.1 |
| 3,919,393 | 11/1975 | Selmeczi | 423/243.05 |
| 3,919,394 | 11/1975 | Selmeczi | 423/243.1 |
| 3,983,217 | 9/1976 | Muraki et al. | 423/243.06 |
| 4,294,807 | 10/1981 | Randolph | 423/243.11 |
| 4,377,557 | 3/1983 | Lowell | 423/243.1 |
| 5,082,639 | 1/1992 | Lee | 423/243.1 |
| 5,132,027 | 7/1992 | Ukawa et al. | 423/243.08 |
| 5,246,679 | 9/1993 | Moser et al. | 423/243.08 |

Primary Examiner—Robert J. Warden
Assistant Examiner—T. A. Trembley
Attorney, Agent, or Firm—Sixbey, Friedman, Leedom & Ferguson

[57] ABSTRACT

An improved magnesium-enhanced lime flue gas desulfurization system is provided which produces the high sulfur dioxide removal level of previous magnesium-enhanced lime flue gas desulfurization systems and additionally produce waste solids that have significantly better properties and are more easily dewatered than the solids produced by known systems. The magnesium-enhanced lime flue gas desulfurization system of the present invention includes a crystallizer-clarifier reaction tank (CCRT) which receives scrubber effluent and functions as a combined reaction tank and thickener. Clear liquor from the CCRT is sent to a scrubber to scrub the flue gas, and a portion of the CCRT—thickened solids are directed to a high pH premix slurry tank (PMST) where the crystallization environment can be controlled by reagent addition and pH. The PMST contents are circulated to the CCRT and are separated to produce a waste solids fraction that is easily dewatered. A fines removal system may also be employed to reduce the presence of fine solids and promote large crystal solids.

8 Claims, 11 Drawing Sheets

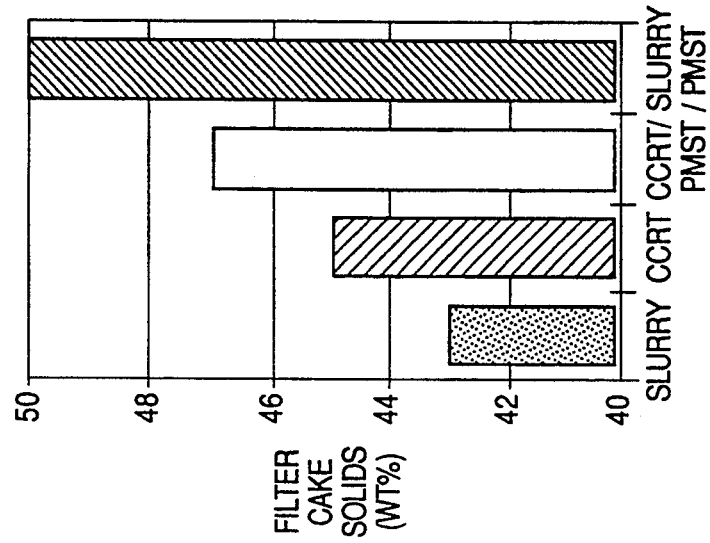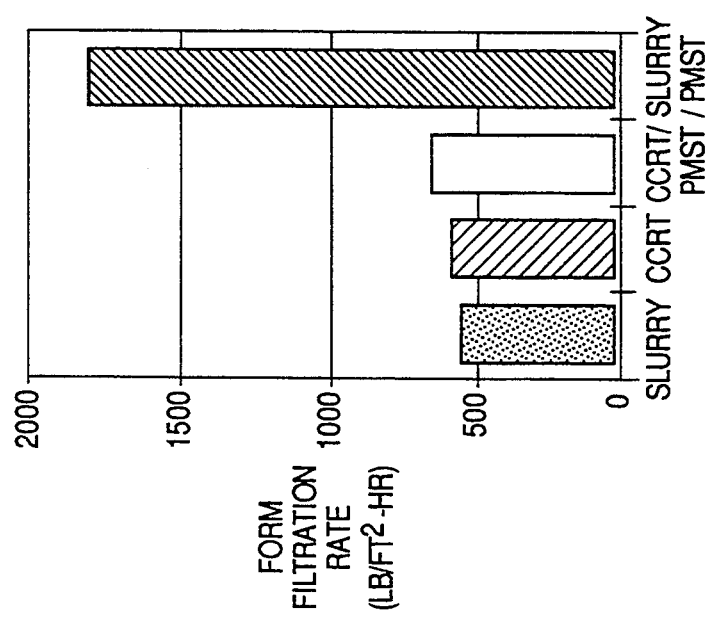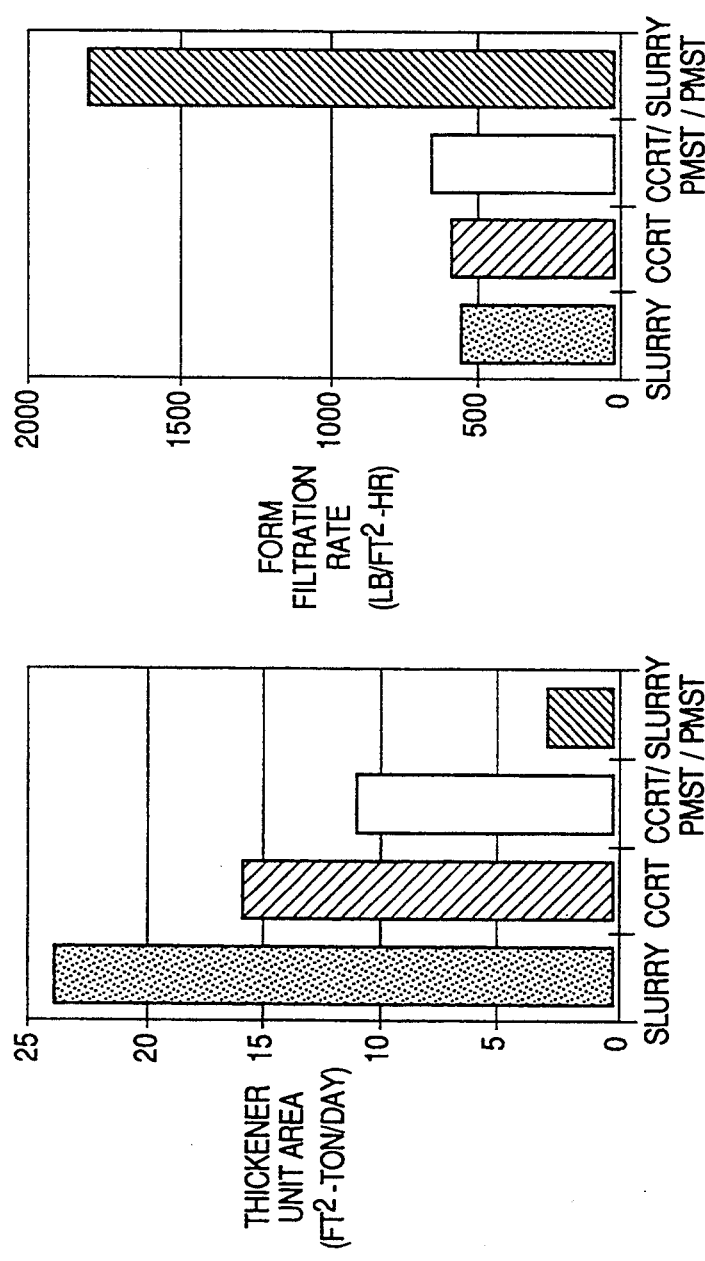

CLEAR LIQUOR SCRUBBING MAGNESIUM-ENHANCED LIME FLUE GAS DESULFURIZATION SYSTEM

This is a divisional application of Ser. No. 07/796,613 filed Nov. 22, 1991, now U.S. Pat. No. 5,213,782.

TECHNICAL FIELD

The present invention relates generally to a system for removing sulfur dioxide from flue gas and specifically to a magnesium-enhanced lime flue gas desulfurization system which produces and uses a clear scrubbing liquor.

BACKGROUND OF THE INVENTION

The desulfurization of flue gas, particularly flue gas from power plants, has been the subject of considerable study. Air quality laws, both at the federal and state level, have set increasingly stringent emissions standards, especially for such known pollutants as sulfur oxides. Because coal and oil-fired electric power generating plants can discharge large quantities of sulfur oxides as combustion by-products, much effort has focused on the desulfurization of flue gas to reduce power plant sulfur dioxide emissions to permissible levels.

Substantial effort has been expended to develop a flue gas desulfurization process which removes substantially all of the sulfur dioxide from the flue gas. Although existing desulfurization process chemistries have achieved high sulfur dioxide removal, these processes have also created other environmental problems. One particularly notable environmental problem to be solved is the disposal of the large quantities of solids produced by the most widely used flue gas desulfurization processes. In the past, flue gas desulfurization by-product solids have been dumped in landfills. However, available landfill space is rapidly diminishing and will not be able to accommodate the disposal of flue gas desulfurization process waste solids if they continue to be generated at the current rate.

One of the available processes for removing sulfur dioxide from flue gas has a high effective sulfur dioxide removal rate. This process, variations of which are disclosed in U.S. Pat. Nos. 3,914,378; 3,919,393 and 3,319,394 to Selmeczi, is a wet scrubbing process which uses magnesium and lime to precipitate sulfur oxides in the flue gas as calcium sulfite and calcium sulfate solids. A slurry is used as the scrubbing medium, and lime is added directly to the scrubbing slurry to precipitate calcium salts. The calcium sulfates and sulfites are precipitated in the presence of soluble magnesium. These solids form a sludge which retains relatively large amounts of water and thus is difficult to dispose of. Consequently, this process is a costly way to desulfurize flue gas.

Although the magnesium-enhanced lime flue gas desulfurization process disclosed in the aforementioned patents effectively removes sulfur dioxide from flue gas, the poor quality of the calcium sulfite solids produced has been a major drawback to the use of this process. A significant aspect of the magnesium-enhanced lime scrubbing process is that magnesium must be kept at 3000–8000 ppm in the liquid phase to achieve the high $SO_2$ removals desired. The soluble magnesium carries with it high concentrations of sulfites and sulfates. The magnesium and sulfates act as crystal habit modifiers, and the calcium sulfite crystals formed are relatively small, needlelike and fragile. As a result, the attrition of these fragile crystals that occurs as they are recirculated through the absorber produces fine solids that dewater at low rates and retain more water than the solids generated by lime or limestone flue gas desulfurization processes. Large thickeners and filters are required to dewater the solids, and the waste disposal problem is costly. In addition, the use of a slurry as the scrubbing medium produces deposits of solids in the quiescent areas of the scrubbing system. The slurry solids also cause abrasion on the pumps, piping nozzles and other system components.

The prior art has proposed a system for removing solids in a wet lime or limestone flue gas desulfurization system which changes crystal size and habit by feeding spent scrubbing liquor to agitated and quiescent crystallization zones in the presence of a crystal habit modifier in U.S. Pat. No. 4,294,807 to Randolph. The system described by Randolph does improve solids dewatering when lime is used for scrubbing. However, this system employs a very different chemistry from a magnesium-enhanced lime flue gas desulfurization process and will not necessarily solve the solids dewatering problem. For example, additives designed to enhance sulfur dioxide removal or control scale in a lime or limestone flue gas desulfurization process are lost by coprecipitation with the product solids in a magnesium-enhanced lime flue gas desulfurization process. There is no suggestion in this patent, moreover, that the crystallization system described therein would improve solids quality or dewatering in any flue gas desulfurization process other than one based on lime or limestone.

The prior art, therefore, has failed to provide a wet magnesium-enhanced lime flue gas desulfurization system or process that effectively improves both the properties and the dewatering characteristics of the solids produced by this process. Consequently, there is a need for a magnesium-enhanced lime flue gas desulfurization system and process which produce both a high sulfur dioxide removal efficiency and easily dewatered and disposed of waste solids.

SUMMARY OF THE INVENTION

It is a primary object of the present invention, therefore, to overcome the disadvantages of the prior art and to provide a wet magnesium-enhanced lime flue gas desulfurization process which produces improved quality, easily dewatered waste solids while effectively removing flue gas sulfur dioxide.

It is another object of the present invention to provide a magnesium-enhanced lime flue gas desulfurization process which maximizes the size of the solid crystals produced.

It is still another object of the present invention to provide a magnesium-enhanced lime flue gas desulfurization process which reduces calcium sulfite crystal attrition.

It is yet another object of the present invention to provide a magnesium-enhanced lime flue gas desulfurization process which produces and uses a clear scrubbing liquor for removing sulfur dioxide from flue gas.

It is a further object of the present invention to provide a magnesium-enhanced lime flue gas desulfurization process wherein sulfites and sulfates are precipitated in an environment free from soluble magnesium.

It is yet a further object of the present invention to provide a magnesium-enhanced lime flue gas desulfurization process wherein the crystallized sludge solids are less sensitive to changes in sulfite and magnesium concentration than in known processes.

It is a still further object of the present invention to provide a magnesium-enhanced lime flue gas desulfurization process characterized by lower dewatering energy costs and smaller dewatering equipment.

The foregoing objects are achieved by providing a wet magnesium-enhanced lime flue gas desulfurization system and process wherein flue gas sulfur dioxide is scrubbed from the flue gas in a scrubber in the presence of a clear scrubbing liquor containing magnesium sulfites and sulfates. The absorbed sulfur dioxide is neutralized and precipitated in at least one crystallizer-clarifier reaction tank (CCRT) separate from the scrubber, and a clear scrubbing liquor is produced. A portion of the slurry fraction is circulated to a premix slurry tank (PMST) maintained at a high pH where lime, magnesium and other reagents are added. The high pH causes the magnesium to precipitate as magnesium hydroxide and thus the calcium precipitates are formed in a magnesium-free environment at low sulfate and sulfite concentrations. Slurry from the premix slurry tank is fed to the crystallizer-clarifier reaction tank where additional waste solids are produced, drawn off and dewatered, and clear liquor is circulated to the scrubber.

The present invention achieves high sulfur dioxide removal efficiencies by maintaining the soluble magnesium sulfite concentrations in the scrubber while precipitating a major fraction of the absorbed sulfur species in an environment free of soluble magnesium which has low sulfate and sulfite concentrations. The present invention additionally prevents crystal degradation by keeping the precipitated solids out of the high-shear environment of the scrubber and the scrubber recirculating liquor loop.

Additional objects and advantages will be apparent from the following description, claims and drawings.

BRIEF DESCRIPTION OF THE DRAWINGS

FIG. 10 is a graphic comparison of process configuration effects on waste solids properties in magnesium-enhnaced lime flue gas desulfurization processes.

DESCRIPTION OF THE PREFERRED EMBODIMENTS

Flue gas desulfurization (FGD) systems that employ magnesium-enhanced lime for sulfur removal have proven to be very reliable and capable of removing large percentages of sulfur at the liquid-to-gas ratios typically encountered in these systems. However, the waste solids produced by magnesium-enhanced lime flue gas desulfurization systems are difficult to dewater. As a result, what would otherwise be an effective flue gas sulfur dioxide removal process can be quite expensive because of the additional equipment required for the process and the increased disposal costs of a low solids concentration waste. The poor solids dewatering properties in the available magnesium-enhanced lime flue gas desulfurization systems are most likely to arise from two conditions, the production of small and fragile crystals and the breakage of these crystals. The return of the scrubber effluent to the high pH reaction tank causes locally high calcium sulfite relative saturations, which in the presence of soluble magnesium and sulfate, produces very fragile needle-like crystals. The recirculation of these very fragile crystals through the absorber or scrubber recycle pumps causes the crystals to break and form even finer particles. The dewatering of such fine particles is not easily accomplished. As a result, the waste solids from available systems must be disposed of with all of the water that cannot be removed.

The flue gas desulfurization system and process of the present invention represents a significant and substantial improvement over known magnesium-enhanced lime flue gas desulfurization processes. The system and process produces larger crystals that do not break as easily and are more easily separated out of solution. Solids dewatering is greatly simplified with the present process. Scrubber effluent is neutralized and precipitated in a crystallizer-clarifier reaction tank (CCRT) to avoid locally high relative saturation. Magnesium-containing lime is added to the CCRT from a separate high pH premix slurry tank and a clear liquor and a thickened solids fraction are formed. The intensity of the mixing and the density of the crystal magma can be varied in the crystallizer reaction zone. Crystal breakage from recirculation is substantially eliminated because only clear liquor is recirculated to the absorber. The premix slurry tank environment improves conditions for crystal growth and is maintained at a high pH to ensure that the calcium sulfites and sulfates are precipitated in an environment with little or no soluble magnesium. Soluble magnesium can have an adverse effect on crystal size and shape. In addition, the concentration of sulfites and sulfates in the crystallizer is reduced, which produces waste solids that are more easily dewatered.

Figure 1A:
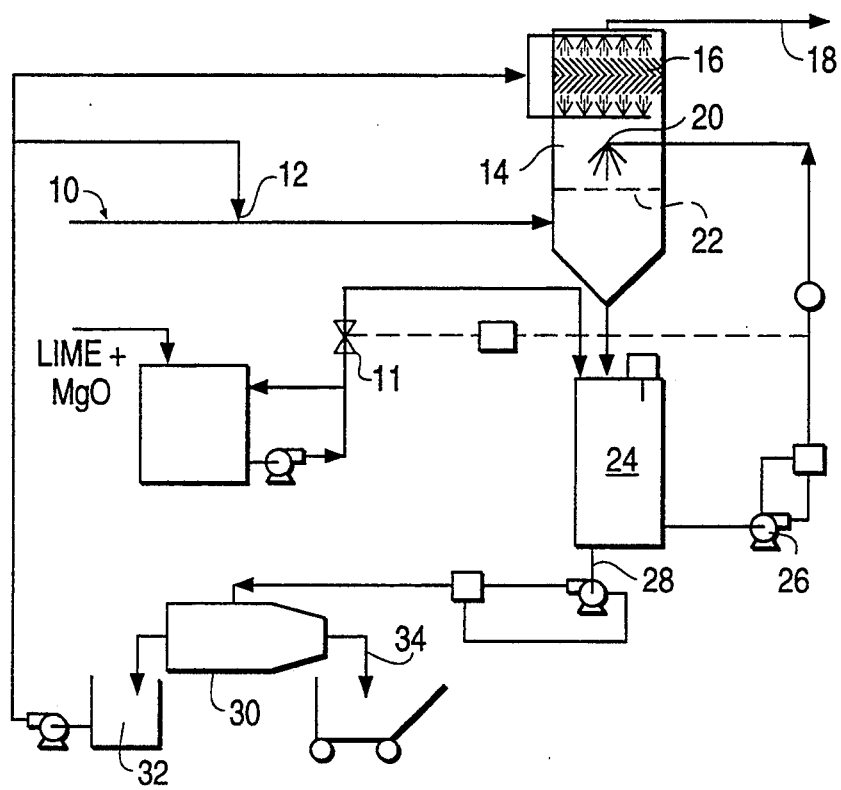
FIGS. 1a and 1b are schematic illustrations of two prior art magnesium-enhanced lime flue gas desulfurization systems.

Referring to the drawings, FIG. 1a illustrates schematically a known magnesium-enhanced lime flue gas desulfurization process. Flue wet gas from a power generating plant (not shown) enters the system at 10, is saturated by service or process water at arrow 12, is directed to a countercurrent spray tower 14, passes through a vertical mist eliminator 16 and then exits the system at 18. Gas/liquid contact in the tower 14 is provided by a single spray header with nozzles 20 and a tray 22. The exit temperature of the flue gas is controlled by heating the inlet flue gas. Absorber or scrubber effluent slurry 23 flows by gravity to a reaction tank 24. Some of this slurry is pumped to the spray header 20 by a pump 26. Slurry solids concentration is controlled by blowing down a waste stream 28 to a horizontal centrifuge 30. Alternatively, a filter system (not shown) could be employed. The resulting centrate or filtrate liquor is pumped from a tank 32 to be used for flue gas quench and mist eliminator wash. The reaction tank level is controlled by the addition of make-up water. System pH is controlled by reagent addition to the reaction tank 24. Reagent addition rate is controlled by a feedback control signal 11. Waste solids dewatered by the centrifuge 30 or filter are discharged at 34. The waste solids concentration for the FIG. 1a system may vary from 40 to 60 wt %, and the return liquor generally contains about 400 ppm solids.

Figure 1B:
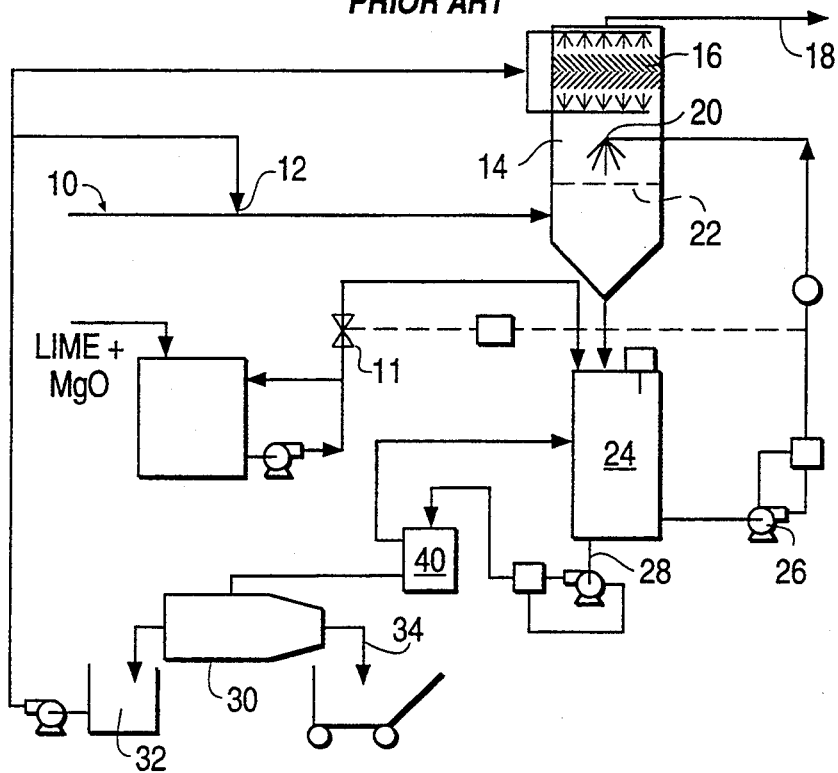

FIG. 1b illustrates the same magnesium-enhanced lime flue gas desulfurization process shown in FIG. 1a, with the exception of the addition of a thickener 40. The centrate liquor in this system contains very fine solids. Returning these fine solid particles to scrubber 14 prevents their removal and dewatering. The thickener 40 reduces the volume of centrate liquor by concentrating the waste to 15 wt % from 4 wt %. A polymer flocculent added to the thickener feed ensures good settling, which does not occur if the flocculate is added after the waste solids have been separated by the centrifuge. However, even the addition of the thickener has not solved the dewatering problems in this magnesium-enhanced lime FGD system.

The scrubbing medium for the foregoing systems is a slurry, and lime is added directly to the scrubbing slurry to precipitate calcium salts. The calcium sulfates and sulfites are precipitated in the presence of soluble magnesium which modifies the crystals to produce solids that retain water and are thus difficult to dewater.

Figure 2:
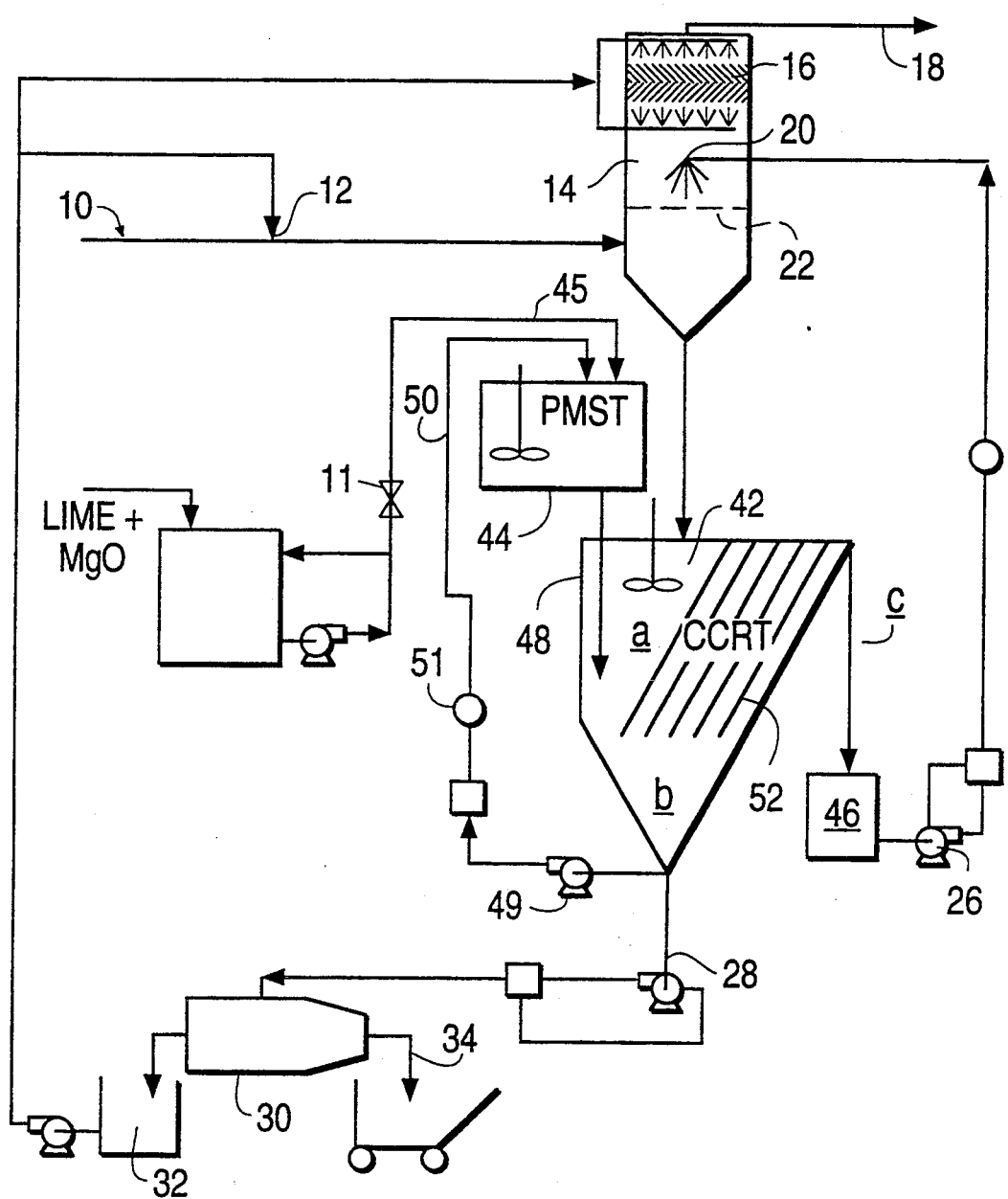
FIG. 2 is a schematic illustration of one configuration of the magnesium-enhanced lime flue gas desulfurization process of the present invention.

The magnesium-enhanced lime FGD system and process of the present invention produces significant improvements in solids dewatering over the aforementioned prior art magnesium-enhanced lime FGD system and processes. Three major changes were made to modify the FGD system shown in FIG. 1a and are illustrated in FIG. 2. A crystallizer-clarifier reaction tank (CCRT) 42 was added to the system to receive the scrubber effluent and to produce a clear scrubbing liquor. A high pH premix slurry tank (PMST) 44 was included to permit more control over the crystallization environment. In addition, the system of the present invention may include a fines removal system (FIG. 3); however, this step is not required.

The CCRT 42 is essentially a combined reaction tank and thickener that separates the calcium sulfite/sulfate waste solids from the scrubbing liquor, which is clarified. Liquor overflow is pumped to the tower 14 to scrub $SO_2$ from the flue gas. This arrangement avoids breakage of the fragile calcium sulfite crystals produced in a magnesium-enhanced lime FGD system by separating the solids before they are sent to the absorber feed pump 26. Consequently, the crystal fragmentation which is thought to produce the poor dewatering and settling properties characteristic of prior art magnesium-enhanced lime FGD system solids does not occur. The CCRT 42 controls solids distribution to minimize calcium sulfite relative saturation. The clear liquor scrubbing slurry minimizes the deposition of solids in quiescent zones in the scrubbing system, eliminates abrasion on pumps, piping and nozzles and eliminates degradation of the dewatering characteristics of the solids particles.

When absorber effluent 23 is introduced into the CCRT 42, it is agitated to produce a well-distributed, suspended magma for calcium sulfite precipitation in a reaction zone a. Lime reagent and solids recycle (premix tank effluent stream 48) is also introduced into the CCRT reaction zone a. Locations of high pH are to be avoided to eliminate the possibility of high calcium sulfite relative saturation. Precipitated calcium sulfite solids separate out from the scrubbing liquor and settle in a hopper or settling zone h at the bottom of the CCRT 42.

The CCRT 42 also includes a clarification zone c, which may include inclined plates 52 to increase the settling area b as shown in FIG. 2. However, these plates 52 are not essential to performance of the clarification function by the CCRT. The function of the clarification section c is to promote the settling of as much of the solids as possible so that the liquor circulated to the scrubber 14 is substantially free of solids. Overflow from the clarification section c may be collected in a holding tank (46) and can be pumped from there to the absorber spray nozzles 20.

Although a single crystallizer-clarifier reaction tank 42 is shown, a series of separate tanks could also be used for the same purpose. The separation of the crystallizer from the scrubber 14 permits the application of optimum crystallization principles and crystallizer design to improve the dewatering characteristics of the precipitates.

The premix slurry tank 44 is essentially a crystallization and reagent addition tank. Reagent 45 is combined with a slurry stream 50 in the premix slurry tank 44 where conditions can be precisely controlled to exert maximum influence over the crystallization environment. The amount of magnesium and lime reagent 45 added is controlled by the feedback control signal 11.

The growth patterns and shapes of the crystal solids in a magnesium-enhanced lime flue gas desulfurization system are affected significantly by the crystallization environment. The presence of magnesium and sulfate adversely affects calcium sulfite crystal formation. In addition, the pH may negatively influence crystal formation. Consequently, the pH of the PMST environment is carefully controlled by controlling the amount of slurry added from the CCRT 42 settling zone b with the magnesium-enhanced lime reagent 45. The pH of the PMST through the pump 49 must be kept in the range of 9.5-12, preferably above 10, to precipitate all of the magnesium as $Mg(OH)_2$, thereby removing the negative effects of soluble magnesium on calcium sulfite crystal growth from the crystallization environment and allowing crystal growth in a magnesium-free environment. Maintaining the pH at this level also reduces sulfite and sulfate concentration in the crystallizer which results in the production of solids that are more easily dewatered. The pH of the PMST 44 may be controlled by varying the recycle flow rate using valve 51.

Recycle slurry 50 to the PMST 44 is CCRT settled solids, as shown in FIG. 2. It is also possible to use a portion of the recirculation liquor to the absorber 14 as PMST recycle (not shown) instead of the CCRT underflow solids. To maximize mixing, reagent 45 and recycle slurry 50 should be introduced at the bottom of the tank 44, rather than the top as shown, if the effluent overflows the tank 44.

Effluent from the high pH PMST 44 directed to the CCRT 42 will mix with the spent scrubbing liquor and will neutralize the acidity of the scrubbing liquor by dissolving the magnesium hydroxide in the PMST effluent.

Figure 3:
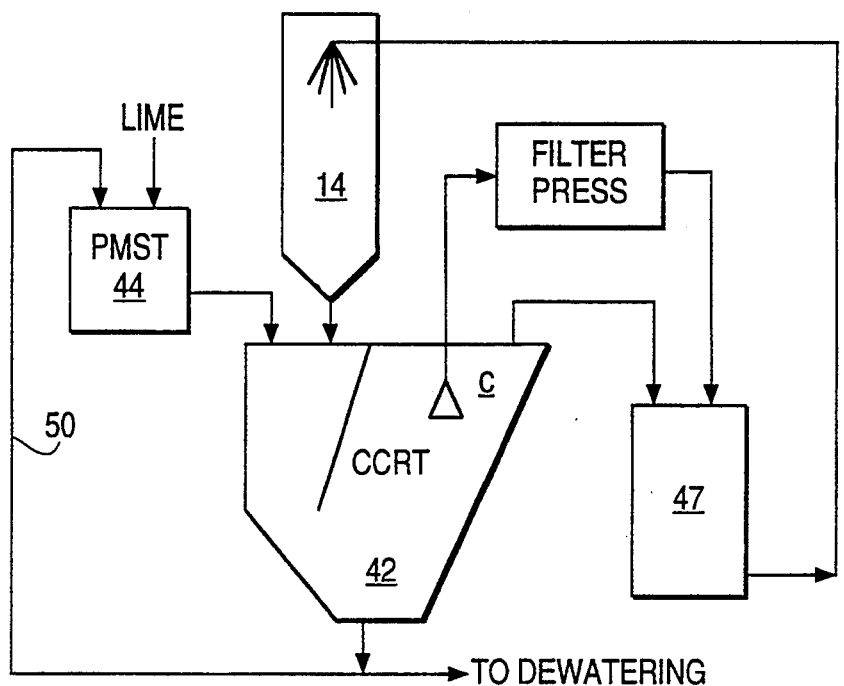
FIG. 3 is a schematic illustration of a fines removal system added to the crystallization-clarifier reaction tank and premix slurry tank in the flue gas desulfurization system of the present invention.

A fines removal system 47 is shown in FIG. 3. This system 47 is based on the concept that the preferential removal of a portion of the crystal nuclei and microcrystals will permit the remaining crystals to grow larger, thus increasing the particle size distribution of the waste solids. In this double draw-off arrangement, the larger crystals dewater and settle better so that the clear liquor from the CCRT 42 contains only the finest crystals. Fines removal is accomplished by reducing the concentration of these fine crystals. The liquor in the clarifying zone c of the CCRT 42 is removed from the CCRT 42 and filtered prior to circulating it to the scrubber 14. The centrate liquor can also be filtered to remove any fine crystals from this liquor before it circulates to the scrubber 14.

The primary objective of the present invention is to produce larger, more easily dewatered calcium/sulfite waste crystals in a magnesium-enhanced lime flue gas desulfurization system. In the magnesium-enhanced lime flue gas desulfurization system, increasing the average crystal size can be achieved by increasing the residence time of the crystals in the system or by decreasing the nucleation rate. Increasing crystal residence time in this type of flue gas desulfurization system would require larger tanks, higher solids concentrations or decreased $SO_2$ removal. Neither increasing the tank size nor decreasing $SO_2$ removal is a desirable option, especially since high $SO_2$ removal is a major advantage of the magnesium-enhanced lime flue gas desulfurization process. Moreover, although increasing the solids concentration would increase residence time, it would also significantly increase contact nucleation and, consequently, the production of difficult to dewater solids. As a result, decreasing nucleation, rather than increasing crystal residence time, was selected for increasing the crystal size distribution in the magnesium-enhanced lime flue gas desulfurization system of the present invention.

Reduction in secondary nucleation and attrition are two mechanisms by which crystal size is increased in the present process. Since secondary nucleation, and possibly attrition as well, increase to some extent as crystal size increases, a substantial reduction in relative saturation, density or agitation are required to increase crystal size in the magnesium-enhanced lime flue gas desulfurization system. It is necessary to maximize residence time of the fines in this system while minimizing needle breeding and contact nucleation. Slurry solids concentration is a key variable in this system. In addition, identification of the kind of nucleation mechanism that is the most important in the magnesium-enhanced lime flue gas desulfurization process is necessary to determine the operating conditions that will minimize or avoid nucleation or needle breeding. If contact nucleation and attrition are the primary nucleation mechanism, solids concentration can be decreased. However, this would result in a higher relative saturation and an increased risk of needle breeding. If needle breeding is a dominant contributor, the relative saturation must be decreased by increasing the solids concentration. Some of the gain in this case, however, will be countered by increased contact nucleation.

The crystallizer-clarifier reaction tank (CCRT) 42 of the present invention directs the solids away from the primary source of contact nucleation and attrition present in existing magnesium-enhanced lime flue gas desulfurization systems, the absorber feed pump 26. Scrubbing liquor is separated from the solids in the CCRT 42 (FIG. 2) and pumped to the spray tower 14. The absorber effluent liquor 23 is returned to the CCRT 42 as feed, and waste solids are precipitated in the CCRT reaction zone a. Simultaneously, the reaction zone magma is mixed thoroughly to minimize dendritic growth problems and excess attrition. A well suspended magma is maintained in the area where the absorber effluent liquor 23 is introduced into the CCRT reaction zone a without excess agitation and in a manner which minimizes zones of high relative saturation. This effectively controls needle breeding at this point which may be a substantial factor in producing poor quality solids in a conventional magnesium-enhanced lime flue gas desulfurization system. Further, the solids concentration in the CCRT reaction zone a may be controlled either to minimize attrition, which requires low solids, or to minimize needle breeding, which requires high solids, by varying the recycle rate.

Figure 4A:
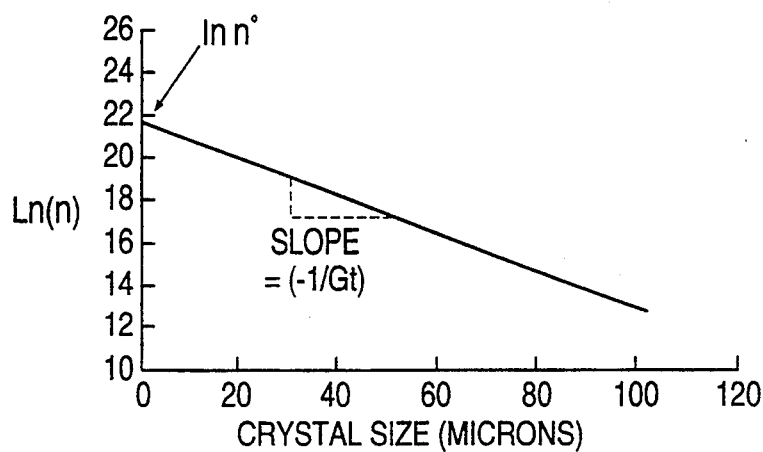
FIGS. 4a, 4b and 4c are graphic representations of crystal population densities for an ideal population, for CCRT waste solids, and for the present invention with a fines removal system.
Figure 4B:
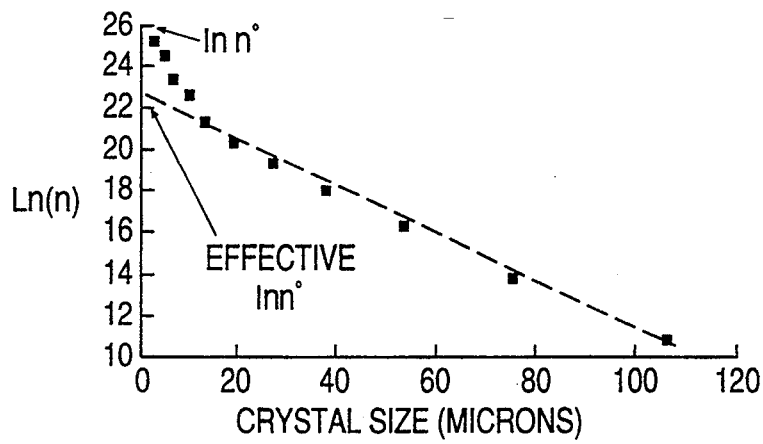
Figure 4C:
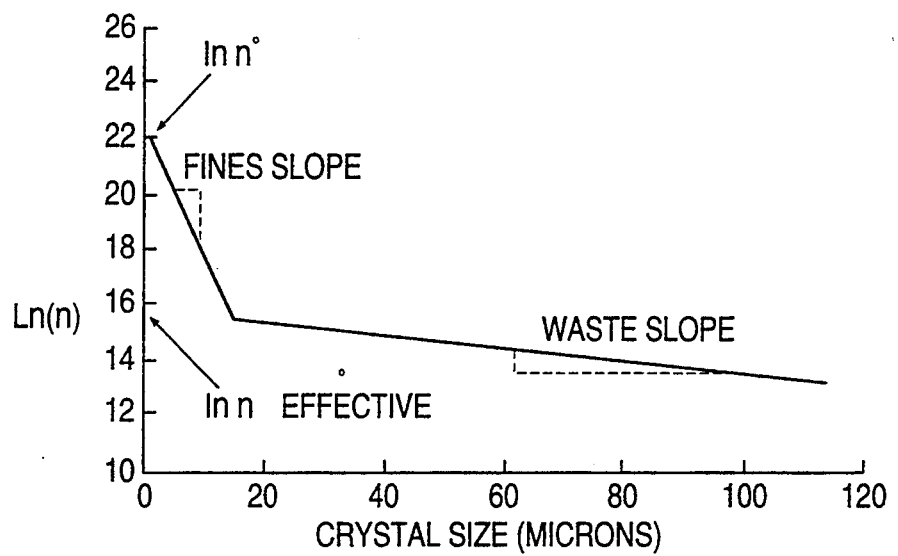

Crystal size may also be increased by removing fines from the system. This may be accomplished as previously discussed by providing a settling zone b in the bottom of the CCRT 42 and by withdrawing suspended material from the top of the CCRT 42. Either the suspension could be filtered to remove the fine material, or the suspended material could be dissolved and fed back to the CCRT 42. In both cases the apparent nucleation is decreased by the preferential removal of nuclei and small crystals. FIGS. 4a, 4b and 4c depict, respectively, the population density for an idealized crystal population, for CCRT waste solids crystals and for the magnesium-enhanced lime flue gas desulfurization system of the present invention with a fines removal system.

When a crystallizer operates at a steady state, the combined material and particle balance predicts that a plot of ln(n), where n is the frequency of a given particle size per volume of slurry, versus L, which is the characteristic length of the crystal, will be a straight line. The zero-size intercept of this plot is $ln(n°)$, the nuclei density, and the slope is $-1/Gt$, where G is the growth rate of the crystals and T is the crystal residence time. This plot is based on the following assumptions: the linear crystal growth rate is invariant with crystal size, the crystallizer is receiving solids-free feed, the crystals are well-suspended, and there is negligible breakage. FIG. 4a illustrates this steady state crystallizer operation.

The graph in FIG. 4b demonstrates that the population density plot may not be a straight line, which may indicate that crystal growth rate in CCRT waste solids is not independent of size. Crystals of different sizes can grow at different rates. Surface imperfections, for example dislocations on the larger crystals, facilitate growth. In this crystallization process, the effective nucleus density is smaller than the true number of crystal nuclei. The population density curve shown in FIG. 4c demonstrates differences in the slopes of the waste product and the fines stream.

The removal of fines in a magnesium-enhanced lime flue gas desulfurization system avoids the crystal size distribution limitations imposed by the system. The minimum mixing and pumping requirements and minimum solids density requirements will always produce some contact nucleation and attrition. In the currently available magnesium-enhanced lime flue gas desulfurization systems, this minimum nucleation rate is unacceptably high. The present magnesium-enhanced lime flue gas desulfurization process removes some of the nuclei and smaller crystals, thus reducing the effective nucleation rate and avoiding the limitations of existing systems.

The magnesium-enhanced lime flue gas desulfurization process of the present invention was evaluated and compared to a known magnesium-enhanced lime flue gas desulfurization process to study process chemistry, solids concentration, the use of a premix slurry tank, residence time and agitator speed as they related to the improvement of waste solids.

A series of preliminary evaluations produced the following observations about the present process:

At higher CCRT reaction zone solids concentrations, the $CaSO_3$ relative saturation is lower and minimizes needle breeding. However, higher solids concentrations also produce an increase in contact nucleation and attrition.

Inhibited oxidation stabilized system operation and resulted in improved solids properties. Oxidation was held at less than 8% by the addition of 1000 ppm thiosulfate in the liquor during the preliminary evaluation. Inhibiting the oxidation increases the dissolved sulfite concentration at a constant magnesium concentration because of a shift in the sulfate-to-sulfite ratio. $SO_2$ removal is improved under these conditions in a system that is not gas-film limited. If $SO_2$ removal in a system is already adequate, inhibiting oxidation may allow a reduction in the liquid-to-gas ratio (L/G) or, in some cases, a larger flue gas bypass flow.

The use of a premix slurry tank (PMST) improved solids properties, even when the PMST volume was reduced and the residence time decreased.

Operating variables and waste solids characterizations results were studied to evaluate the magnesium-enhanced lime flue gas desulfurization process of the present invention. This testing involved setting the equipment configurations, starting the systems up with specified operating parameters, adjusting chemistry as needed, operating for three solid phase residence times, and sampling product slurry and other process streams. Temperatures, pressures, flow rates, $SO_2$ removal and other process data were collected. Table I sets forth the schedule of collection for analysis of liquor, solid and slurry samples.

TABLE I

| STREAM SAMPLED | LINE-OUT-PERIOD | FINAL SAMPLE PERIOD |
|---|---|---|
| Scrubbing Slurry | AM: pH, Temp, Wt % PM: pH, Temp, Wt % | AM: pH, Temp, Wt % Pm: pH, Temp, Wt % |
| Scrubbing Liquor | AM: $SO_3$, $S_2O_3$, Mg PM: $SO_3$, $S_2O_3$ | AM: Ca, Mg, Na, $SO_3$ $SO_4$, $CO_3$, Cl, $S_2O_3$ |
| CCRT Underflow solids | Not Sampled during line - Out Period | AM: Ca, Mg, $CO_3$, $SO_4$, inerts, Filtration test, Settling Test, Save for Microscopy and Particle Size Distribution Test |
| Absorber Effluent Centrifuge Product | AM: pH, Temp AM: Wt % PM: Wt % | AM: pH, Temp AM: Wt % PM: Wt % |
| CCRT | AM: pH, underflow wt % PM: pH, Underflow wt % | AM: pH, Underflow wt % Mixing Zone wt% PM: pH Underflow wt % Mixing Zone wt % |
| PMST Liquor | AM: pH PM: pH | AM: pH, $SO_3$, Mg, $SO_4$, $CO_3$, CA PM: pH, $SO_3$, Mg, $SO_4$, $CO_3$, Ca |

In addition, solids properties were evaluated using a settling test, a filter leaf test and a centrifuge product solids concentration test.

The settling test results were designed to provide an estimate of the unit area (UA) required to thicken a slurry to a given concentration. UA is defined as follows:

$UA(ft^2 \cdot day/ton) = t/(C.H)$ where t=days required for slurry to reach target concentration C=initial solids concentration (tons/$ft^3$); and H=height of test column (ft).

The target concentration was 30 wt %, which represents a minimum concentration that would be typical for an electric utility company's flue gas desulfurization thickener application. The UA values presented herein are relative values.

The filter leaf test results provide information about the expected performance of a rotary drum or disc vacuum filter with the tested slurry. Filter cake solids concentration was also determined. The time required for a given sample of slurry to be filtered was measured. The form filtration rate (FFR) is defined to be:

$FFR(lb/ft^2 \cdot hr) = Ws/(t.A)$ where:

t=time to form the cake (hr)

Ws=weight of solids filtered (lb); and

A=area of test filter ($ft^2$)

The cake solids concentration (wt %) was found by drying and weighing the cake from the filter leaf test to determine its solids content.

The product slurry from the centrifuge was also analyzed for solids content. The centrifuge product solids concentration (CP) can provide a good indication of waste solids quality. The possibility of inconsistent centrifuge operation precludes the use of this characteristic as an analytical measurement, however.

Table II summarizes operating variables and waste solids characterization results for a series of tests conducted to evaluate the magnesium-enhanced lime flue gas desulfurization process of the present invention and to compare this process to a conventional magnesium-enhanced lime flue gas desulfurization process.

TABLE II

| TEST CCRT- | pH | Mg mM | $SO_3$ mM | $S2O3$ mM | CCRT Under-flow wt % | Poly-mer | Premix tank | PMST Residence Time min | Premix Agitator RPM | CCRT Agitator RPM | Thickener Unit Area ft2-day/ton | Filtration Rate lb/hr-ft2 | Filter cake wt % |
|---|---|---|---|---|---|---|---|---|---|---|---|---|---|
| M1 | 6.5 | 23 | 80 | 8.6 | 14 | YES | NO | | | 300 | 5 | 930 | 49 |
| M2 | 6.5 | 25 | 76 | 7.8 | 16 | YES | YES | 15 | 1200 | 300 | 4 | 1009 | 55 |

TABLE II-continued

| TEST CCRT- | pH | Mg mM | SO3 mM | S2O3 mM | CCRT Under-flow wt % | Poly-mer | Premix tank | PMST Residence Time min | Premix Agitator RPM | CCRT Agitator RPM | Thickener Unit Area ft2·day/ton | Filtration Rate lb/hr·ft2 | Filter cake wt % |
|---|---|---|---|---|---|---|---|---|---|---|---|---|---|
| M3 | 6.5 | 45 | 76 | 8.3 | 11 | YES | YES | 15 | 1200 | 300 | 5 | 920 | 53 |
| M4 | 6.5 | 113 | 71 | 8.9 | 14 | YES | YES | 15 | 1200 | 300 | 6 | 649 | 49 |
| M4-A1 | 6.5 | 119 | 72 | 8.4 | 14 | YES | YES | 15 | 2800 | 300 | 10 | 697 | 48 |
| M4-A2 | 6.5 | 117 | 68 | 8.9 | 15 | YES | YES | 15 | 680 | 300 | 3 | 1343 | 50 |
| M4-W1 | 6.5 | 118 | 78 | 9.0 | 24 | YES | YES | 15 | 1200 | 300 | 4 | 1073 | 50 |
| M5 | 6.5 | 114 | 63 | 8.9 | 13 | YES | NO | | | 300 | 16 | 599 | 45 |
| M6 | 6.5 | 136 | 33 | 9.5 | 15 | YES | NO | | | 300 | 4 | 1470 | 48 |
| M7 | 6.5 | 128 | 33 | 8.8 | 17 | YES | YES | 15 | 1200 | 300 | 2 | 1470 | 52 |
| M6R | 6.5 | 129 | 29 | 9.4 | 13 | YES | NO | | | 300 | 1 | 1294 | 55 |
| M8 | 6.5 | 112 | 105 | 8.8 | 14 | YES | NO | | | 300 | 20 | 763 | 43 |
| M9 | 6.5 | 145 | 118 | 10.9 | 14 | YES | YES | 15 | 1200 | 300 | 3 | 777 | 51 |
| M10 | 6.5 | 122 | 110 | 9.9 | 16 | YES | YES | 15 | 1200 | 300 | 3 | 1234 | 51 |
| M11 | 6.5 | 126 | 73 | 9.5 | 14 | NO | YES | 15 | 1200 | 300 | 7 | 1270 | 45 |
| M12 | 6.5 | 120 | 75 | 9.0 | 13 | NO | YES | 15 | 680 | 300 | 4 | 1545 | 50 |
| M11R | 6.5 | 124 | 76 | 9.5 | 15 | NO | YES | 15 | 1200 | 300 | 8 | 1485 | 45 |
| M12R | 6.5 | 126 | 69 | 8.1 | 14 | NO | YES | 15 | 680 | 300 | 3 | 2107 | 48 |
| M13 | 6.5 | 134 | 65 | 8.3 | 14 | NO | YES | 15 | 200(1) | 300 | 6 | 1424 | 45 |
| M14 | 6.5 | 137 | 77 | 8.5 | 14 | NO | YES | 15 | 680 | 120 | 4 | 967 | 51 |
| M15 | 6.5 | 125 | 66 | 9.0 | 22 | NO | YES | 15 | 680 | 120 | 3 | 1276 | 51 |
| M16 | 6.5 | 127 | 72 | 9.0 | 15 | NO | YES | 15 | 680 | 300 | 6 | 900 | 49 |
| M17 | 6.5 | 129 | 72 | 9.9 | 15 | NO | YES | 10 | 680 | 300 | 4 | 1070 | 52 |
| M19 | 6.5 | 117 | 72 | 8.6 | 15 | NO | YES | 5 | 680 | 300 | 7 | 512 | 50 |
| MGLIM-9 | 6.5 | 125 | 68 | 8.8 | 4(2) | YES | NO | | | | 22 | 383 | 45 |
| MGLIM-9R | 6.5 | 136 | 69 | 7.8 | 4 | YES | NO | | | | 28 | 731 | 41 |
| MGLIM-10 | 6.5 | 128 | 77 | 8.0 | 4 | YES | YES | 15 | 680 | | 11 | 677 | 47 |
| MGLIM-11 | 6.5 | 132 | 68 | 8.7 | 4 | YES | YES | 15 | 680 | | 11 | 1170 | 48 |
| MGLIM-12 | 6.5 | 127 | 69 | 41.0 | 4 | YES | NO | | | | 25 | 730 | 43 |
| MGLIM-12A | 7 | 123 | 47 | 41.0 | 4 | YES | NO | | | | 29 | 840 | 41 |
| MGLIM-13 | 6.5 | 125 | 74 | 35.0 | 4 | YES | YES | 15 | 680 | | 10 | 930 | 47 |
| MGLIM-13A | 7 | 129 | 65 | 40.0 | 4 | YES | YES | 15 | 680 | | 12 | 650 | 46 |

(1)Low shear Impeller at minimum speed.
(2)Scrubbing slurry at 4 wt %

Tests MGLIM-9 and MGLIM-9R, which evaluate the system configuration shown in FIG. 1a, were used as baseline slurry configuration tests. Tests CCRT-M1 through CCRT-M19 all evaluated the effects of CCRT/PMST process chemistry and operating variables. Each specifically evaluated the following conditions:

| Test | Conditions |
|---|---|
| CCRT-M1 | Low Mg |
| CCRT-M2 | Low Mg/PMST |
| CCRT-M3 | Medium Mg/PMST |
| CCRT-M4 | High Mg/PMST |
| CCRT-M4A1 | High PMST agitation |
| CCRT-M4A2 | Low PMST agitation |
| CCRT-M4W1 | Increased recycle wt % |
| CCRT-M5 | High Mg |
| CCRT-M6/6R | Low sulfite |
| CCRT-M7 | Low sulfite/PMST |
| CCRT-M8 | High sulfite |
| CCRT-M9 | High sulfite/high Mg/PMST |
| CCRT-M10 | High sulfite/PMST |
| CCRT-M11/11R | Eliminated polymer addition to reaction zone |
| CCRT-M12/12R | Low PMST agitation |
| CCRT-M13 | Low shear PMST agitation |
| CCRT-M14 | Low CCRT agitation |
| CCRT-M15 | High recycle wt % |
| CCRT-M16 | Modify reagent addition point |
| CCRT-M17 | Reduced PMST residence time |
| CCRT-M19 | Further reduction in PMST residence time |

Figure 5A:
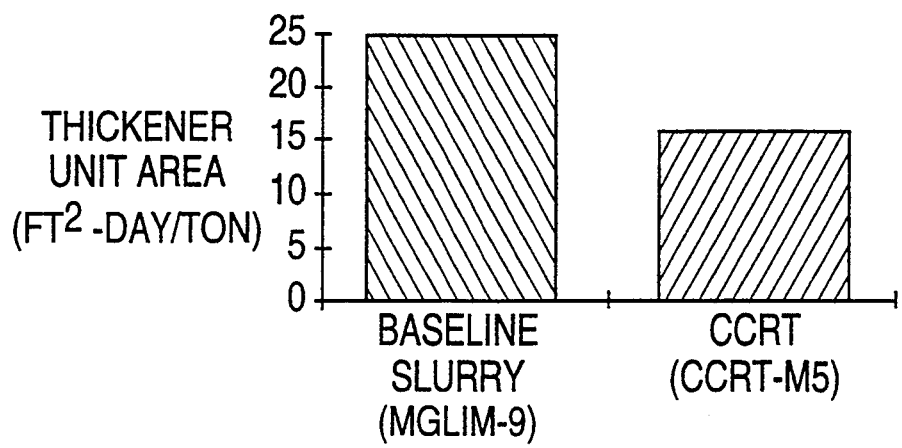
FIG. 5 is a graphic comparison of the process waste solids produced by a prior art magnesium-enhnaced lime flue gas desulfurization process and by the magnesium-enhanced lime flue gas desulfurization process of the present invention.
Figure 5B:
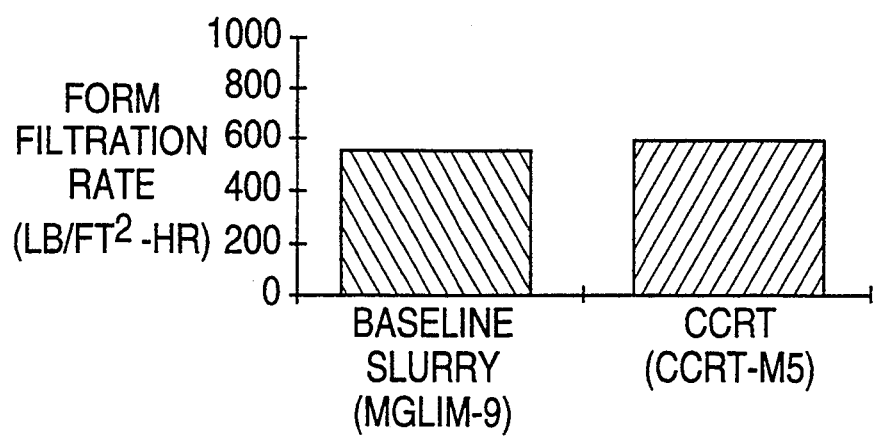
Figure 5C:
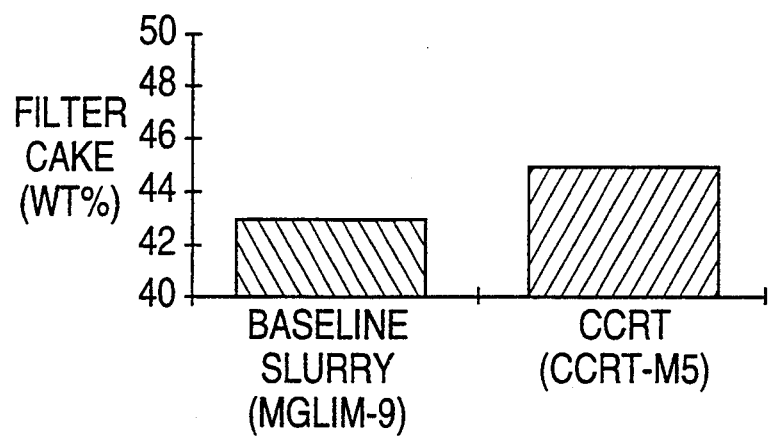
Figure 6A:
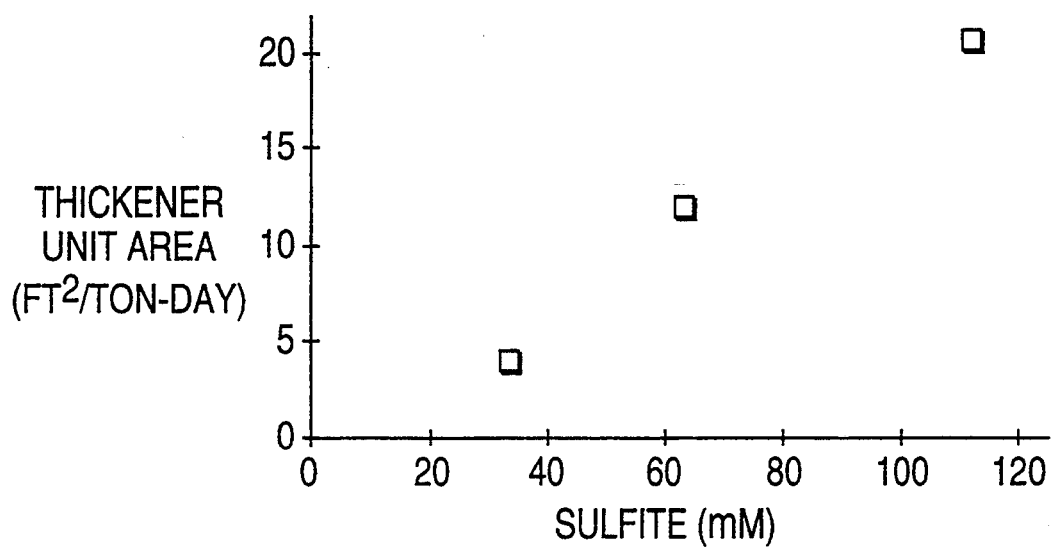
FIG. 6 illustrates, in graphic form, the effect of sulfite and magnesium on waste solids properties in a magnesium-enhanced lime flue gas desulfurization system with a CCRT but without a PMST.
Figure 6B:
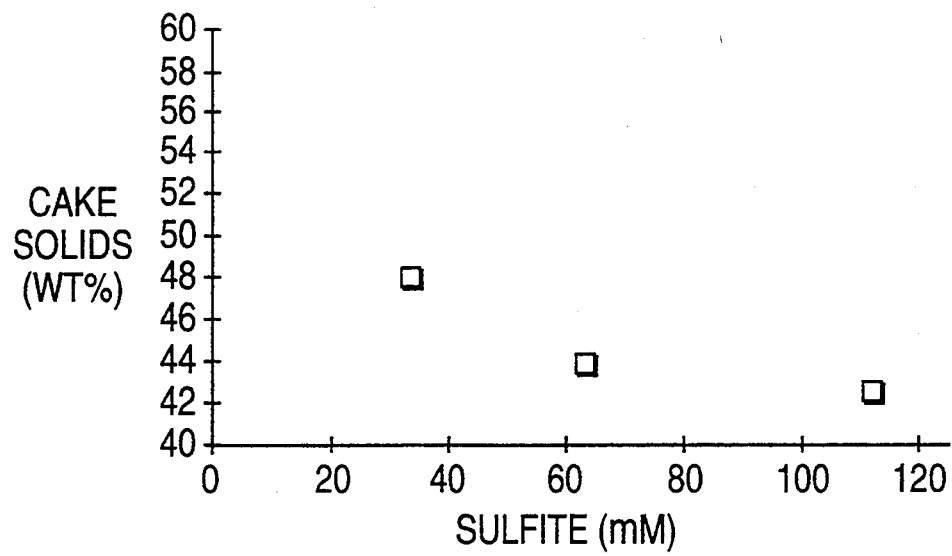
Figure 6C:
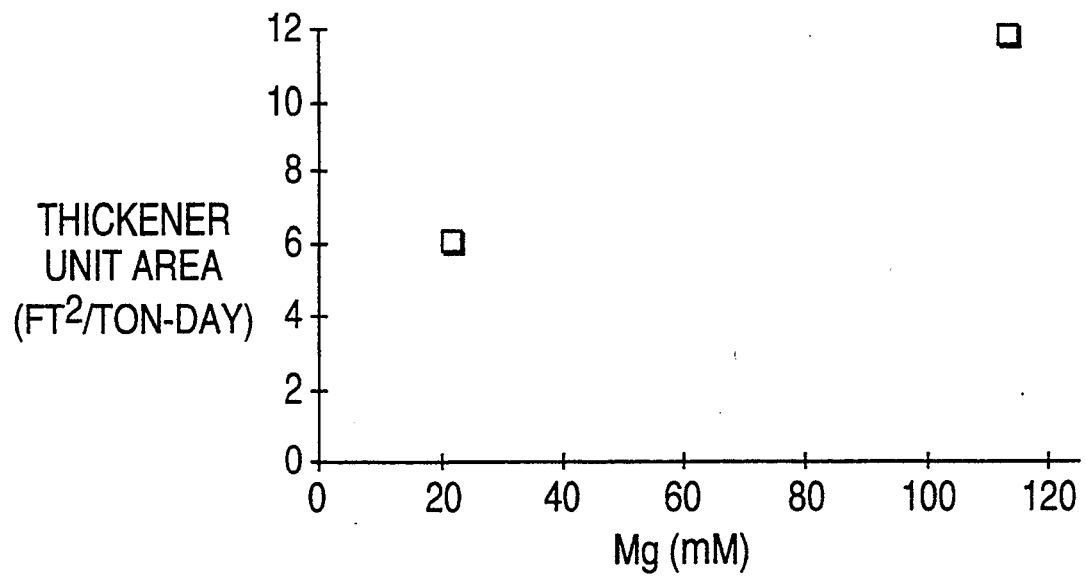
Figure 6D:
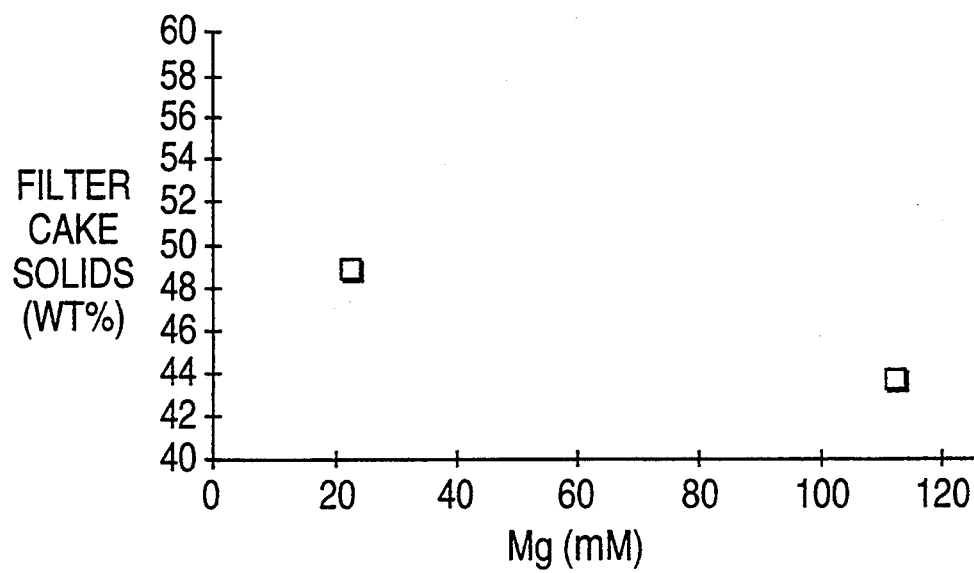
Figure 7A:
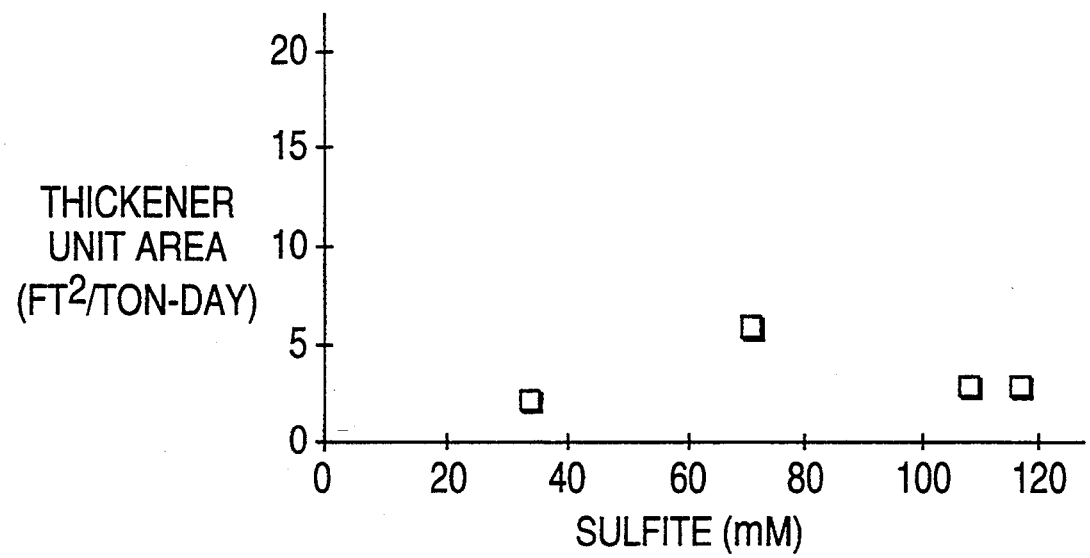
FIG. 7 is a graphic illustration of the effect of sulfite and magnesium on waste solids properties in a magnesium-enhanced lime flue gas desulfurization system with a CCRT and a PMST.
Figure 7B:
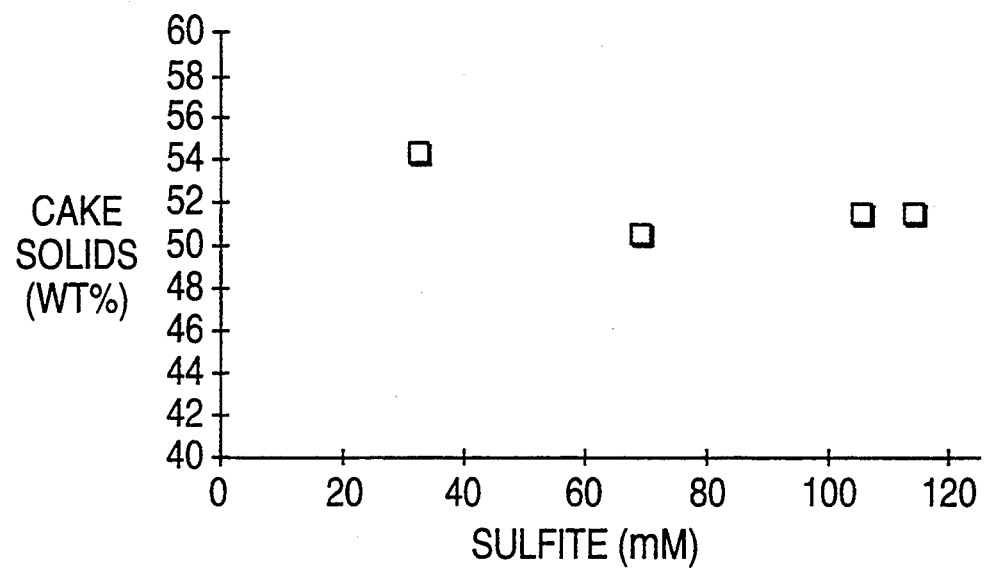
Figure 7C:
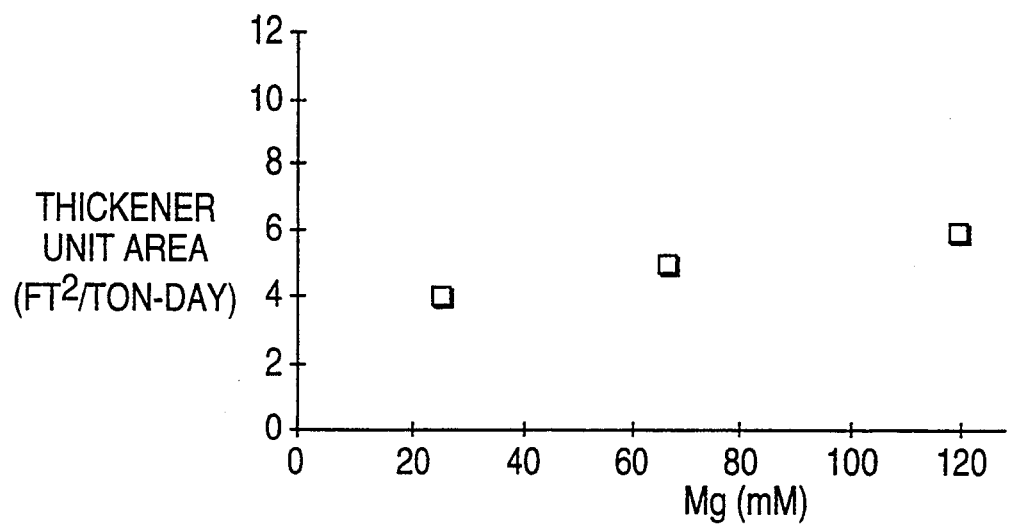
Figure 7D:
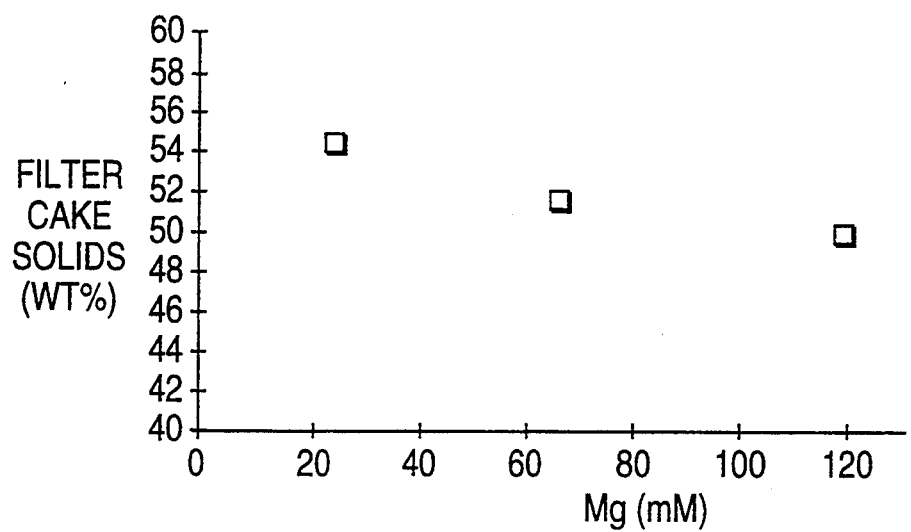

FIG. 5 compares CCRT and conventional slurry process waste solids and shows that, at similar chemistries, the addition of the crystallizer-clarifier reaction tank (CCRT) to a magnesium-enhanced lime flue gas desulfurization process improved waste solids settling properties and filter cake solids weight percent, but had little impact on the filtration rate. With the CCRT, the solids inventory in the system was low, and the mean residence time was between one and two hours, as compared to the baseline slurry test (MGLIM-9/9R), in which the residence time was about 9.5 hours. Although the lower residence time in the CCRT would tend to produce smaller crystals, secondary nucleation and attrition were minimized because the crystals from the CCRT did not pass through the centrifugal pump that feeds the scrubber or absorber spray header.

Increased dissolved magnesium and sulfite concentrations caused a decline in waste solids properties with only the CCRT in operation as shown in FIG. 6. When the liquor magnesium (Mg) concentration was increased from 23 mM (CCRT-M1) to 114 mM (CCRT-M5), the UA increased from 5 to 16 ft$^2$·day/ton, and filter cake solids content decreased from 49 to 45 wt %. Liquor sulfite was kept constant as Mg was increased by lowering the sodium concentration. Magnesium will be either coprecipitated with or absorbed on the waste solids. When the liquor magnesium is increased, magnesium concentration in the waste solids increased from 0.07 to 0.19 mmol/g. The resulting decline in solids dewatering Properties is most likely caused by a combination of increased solid phase magnesium and the crystal habit modifier action of the liquid-phase magnesium.

Because of the potentially adverse effects of magnesium and sulfite, as discussed above, on crystal growth and solids dewatering properties, an objective of the magnesium-enhanced lime flue gas desulfurization system of the present invention is to create an environment for crystal growth that is substantially free of magnesium and sulfite. The creation of such an environment requires raising the pH to a high alkaline level within the range of 9.5–12 and preferably above 10. The pH is controlled by adjusting the recycle flow through the premix slurry tank to the CCRT reaction zone. This recycle flow comes from the thickened CCRT underflow. The CCRT has a pH of about 6–7. For most of the tests evaluating the PMST, the recycle flow rate was 2 gpm with 15 wt % solids. These conditions resulted in the precipitation in the PMST of about one-third of the stoichiometric amount of sulfite precipitated in the system.

Increasing the liquor magnesium and sulfite concentrations causes the solids dewatering properties to decline. However, the addition of the PMST produces CCRT solids that are much less sensitive to changes in sulfite and magnesium concentrations, as shown in FIG. 7. FIGS. 6 and 7 compare changes in dewatering characteristics for the CCRT as a function of magnesium and sulfite concentrations with and without the PMST. Changes in sulfite and magnesium concentration were made independent of each other by using sodium in place of magnesium for the sulfite series of tests and by using chloride in place of sulfite in the magnesium series of tests.

The present invention eliminates liquid phase magnesium and sulfite at the high pH environment in the PMST, which produces the improved results and lower sensitivity of the system. The presence of high concentrations of seed crystals in the PMST may also improve crystal growth. These seed crystals, and the low liquid-phase sulfite, sulfate and magnesium concentrations which exist when the PMST effluent is added to the CCRT, may also contribute to the dramatic improvements in dewatering characteristics under certain conditions.

The effects of magnesium and sulfite on the process chemistry of the magnesium-enhanced lime flue gas desulfurization process with the configuration shown in FIG. 2 were studied. Increasing the magnesium concentration of the scrubbing liquor produces an increase in the UA and a decrease in the filter cake solids content. The magnesium here either acts like a crystal habit modifier, coprecipitates in the sulfur matrix, or both, which results in a decline in waste solids properties.

Sulfites, however, affected waste solids properties differently. Initially, as the sulfite was increased, the UA increased, most likely because the solids residence time is shorter due to increased $SO_2$ removal or crystal habit modifier effects of the sulfite. However, when the sulfite was increased above 70 mM, the UA decreased.

Increase of the sulfite above about 70 mM does not increase $SO_2$ removal since the system is gas film limited. However, as the liquor sulfite concentration increases, the fraction of sulfite precipitated in the PMST also increases. For example, if 1.4 moles/min of $SO_2$ is absorbed at 70 mM sulfite with a PMST feed flow rate of 2 gpm, 38% of the sulfite will precipitate in the PMST. Increase of the sulfite to 140 mM may increase $SO_2$ only to about 1.6 mole/min. At the same feed rate, 66% of the sulfite will be precipitated in the PMST. The more sulfite that is precipitated in the PMST, the better the properties of the waste solids will be.

When the filter cake solids were evaluated as the sulfite concentration was increased, no difference in weight % of the filter cake solids was noted when the PMST was included in the process configuration as compared to when it was not included. In addition, sulfite concentrations above 70 mM did not change the filter cake solids.

Figure 8A:
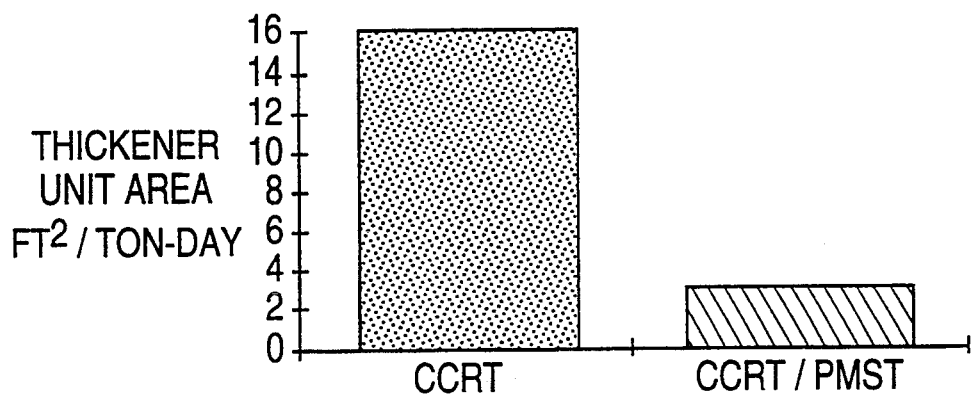
FIG. 8 illustrates graphically a comparison of the solids Properties produced by two variations of magnesium-enhanced lime flue gas desulfurization process configurations according to the present invention.
Figure 8B:
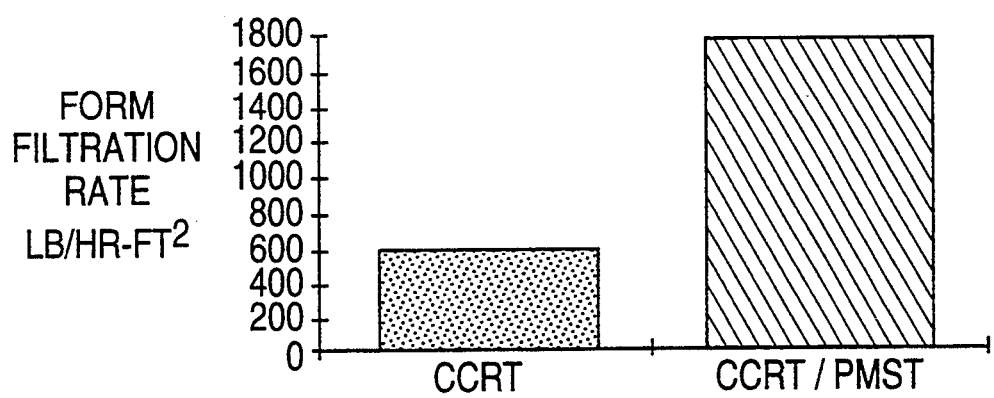
Figure 8C:
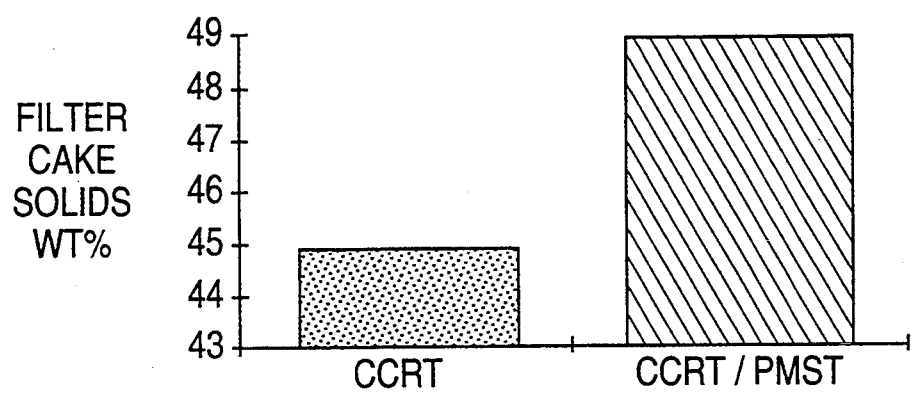

FIG. 8 illustrates the improvements in solids properties produced when a magnesium-enhanced lime flue gas desulfurization system configuration includes both a crystallizer-clarifier reaction tank (CCRT) and a premix slurry tank (PMST). The thickener unit area (UA), filter cake, and filtration rate were all significantly better than in the slurry baseline test (MGLIM-9) or with the PMST or the CCRT alone. The tests results clearly establish a synergy between the PMST and the CCRT. The CCRT reduces secondary nucleation and attrition and, consequently, promotes larger crystals. The PMST modifies crystal habit, which may affect crystal shape and susceptibility to breakage. When the CCRT and PMST are both employed in a magnesium-enhanced lime flue gas desulfurization system, as shown in FIG. 2, the solids waste occupied only one-tenth of the required thickener area, had a 14% higher solids content and used one-third of the required filter capacity when compared to the baseline slurry tests.

Tests CCRT-M12, CCRT-M17 and CCRT-M19 (Table II) demonstrate the effects of decreasing PMST mean residence time. The form filtration rate decreased when the PMST residence time was decreased. Increased PMST residence time resulted in a crystal size and/or shape that filtered faster, but did not settle better or retain less water.

Solids properties in the magnesium-enhanced lime flue gas desulfurization system configuration of the present invention are affected significantly by the speed of the agitator in the PMST. Increasing the PMST agitator speed from 680 RPM (Test CCRT-M11) increased the unit area (UA) from 3 to 8 $ft^2 \cdot day/ton$ and decreased the filter cake solids content from 50 to 45 wt %. The higher PMST agitator speeds probably increased secondary nucleation and attrition. Changing the mixing intensity in the CCRT reaction zone, however, did not produce a measurable effect. Because the solids concentration in the PMST was about five times greater than in the CCRT reaction zone, it is expected that the PMST would be more sensitive to agitation.

The quality of the mixing in the PMST may also influence waste solids characteristics. Decreasing the PMST residence time to 5 minutes (Test CCRT-M19) produced mixing problems because the PMST level was low enough so that vibrations caused the agitator to tilt out of the tank. Poor mixing in the PMST increased to UA from 3 to 16 $ft^2 \cdot day/ton$. In this case poor magma suspension may have produced needle breeding and caused the formation of weak dendritic crystals.

$SO_2$ removal efficiency was determined to depend on dissolved sulfite concentration. FIG. 11 illustrates the relationship between $SO_2$ removal and sulfite concentration. At about 80 mM of sulfite, the improvement in removal observed with increasing sulfite concentration begins to diminish. At this concentration the liquid-phase alkalinity is sufficiently high that the transfer of $SO_2$ through the gas film is the limiting step in $SO_2$ removal. Tests at a pH of about 7 confirmed this. At this pH, the sulfite-bisulfite equilibrium shifts toward sulfite, increasing the liquid phase alkalinity. However, the $SO_2$ removal was not higher.

Figure 9:
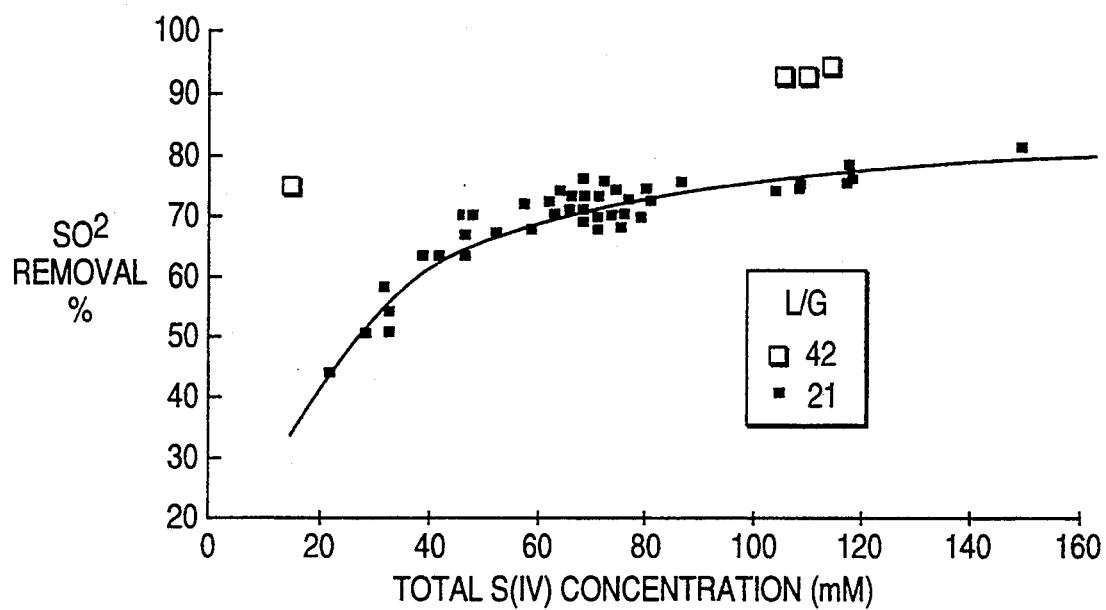
FIG. 9 presents graphically the relationship between sulfite concentration and $SO_2$ removal.

FIG. 9 demonstrates that the three tests run at a liquid gas ratio (L/G) of 42 resulted in higher $SO_2$ removals for a given sulfite concentration. Increasing L/G increases the gas/liquid contact area and increases the maximum attainable removal. $SO_2$ removal efficiency was not affected by clear liquor scrubbing or any of the other process variations tried, but was affected by the mass transfer characteristics of the spray tower and the liquid phase alkalinity of the liquor.

FIG. 10 further illustrates the effects of system configuration on waste solids properties for magnesium-enhanced lime flue gas desulfurization systems. Thickener unit area, form filtration rate and filter cake solids were evaluated for a conventional magnesium-enhanced lime flue gas desulfurization system (slurry), for a clear liquor magnesium-enhanced lime flue gas desulfurization system which included only a crystallizer-clarifier reaction tank in the system configuration (CCRT), for a magnesium-enhanced lime flue gas desulfurization system which included only a premix slurry tank in the system configuration (PMST), and for the magnesium-enhanced lime clear liquor flue gas desulfurization system of the present invention which includes both a crystallizer-clarifier tank and a premix slurry tank in the process configuration (CCRT/PMST). Although improvements in the waste solids properties evaluated in FIG. 10 were shown for all of these process configuration modifications, the addition of both a CCRT and a PMST to the process configuration clearly has a synergistic effect on the improvement of waste solids properties.

The magnesium-lime flue gas desulfurization system and process of the present invention dramatically improves the dewatering characteristics of the solids produced. These improvements, particularly the improvements in settling characteristics, should decrease significantly capital and operating costs of magnesium-enhanced lime flue gas desulfurization systems incorporating them. Although the economies of this system will perhaps be most effectively realized in the construction of new flue gas desulfurization systems, existing systems can be modified to incorporate the CCRT and PMST of the present invention.

INDUSTRIAL APPLICABILITY

The magnesium-enhanced lime flue gas desulfurization system and process of the present invention will find its primary use in connection with electric power generating plants using sulfur-containing fuels which produce flue gases that must be scrubbed to remove the sulfur oxides prior to discharge into the environment. However, the novel process and system of the present invention will also be useful in connection with the removal of sulfur oxides from any industrial process when it is desired to produce larger, more easily dewatered calcium and sulfur-containing waste solid crystals.

We claim:

1. A magnesium-enhanced lime flue gas desulfurization system wherein sulfur dioxide is removed from a supply of sulfur dioxide-containing gas by scrubbing in the presence of aqueous magnesium and lime to produce easily dewatered calcium sulfite waste solids, said system comprising:
   (a) scrubber means for receiving a supply of sulfur dioxide-containing gas and contacting said sulfur dioxide-containing gas with an aqueous liquid, said scrubber means including a first discharge outlet for scrubbed gas and a second discharge outlet for scrubber effluent;
   (b) crystallizer-clarifier reaction tank means fluidically connected to said scrubber means for receiving scrubber effluent and for separating said scrubber effluent into a clear liquor fraction and a thickened solids fraction;
   (c) premix slurry tank means fluidically connected to said crystallizer clarifier reaction tank means for receiving and crystallizing said thickened solids fraction, wherein said premix slurry tank means includes reagent addition means for adding reagent to said premix slurry tank means; pH control means for controlling crystal formation and growth, an inlet for receiving said thickened solids fraction from the crystallizer-clarifier reaction tank means and an outlet for directing crystallized solids back to said crystallizer-clarifier reaction tank means; and
   (d) solids dewatering means for separating solids recirculated through said crystallizer-clarifier reaction tank means and for producing an aqueous liquid fraction for circulation through the system to said scrubber means and to contact said sulfur dioxide-containing gas.

2. The magnesium-enhanced lime flue gas desulfurization system of claim 1, wherein said crystallizer-clarifier reaction tank means includes a reaction zone, a clarifying zone and a thickening zone, and said scrubber effluent is received in said reaction zone and said thickened solids fraction is discharged from said thickening zone to said premix slurry tank means.

3. The magnesium-enhanced lime flue gas desulfurization system of claim 2, wherein said clarifying zone is fluidically connected to said scrubber means to direct said clear liquor fraction to said scrubber means.

4. The magnesium-enhanced lime flue gas desulfurization system of claim 1, wherein said reagent addition means includes reagent control means for adding only desired quantities of reagents to said premix slurry tank means to produce optimum crystal size and shape.

5. The magnesium-enhanced lime flue gas desulfurization system of claim 4, wherein said pH control means includes slurry pump means for regulating the flow of said thickened solids fraction to said premix slurry tank means to main the pH of said premix slurry tank means within the range of 9.5–12.

6. The magnesium-enhanced lime flue gas desulfurization system 4, wherein said pH control means includes valve means for regulating the flow of said thickened solids fraction to said premix slurry tank to maintain the pH of said premix slurry tank within the range of 9.5–12.

7. The magnesium-enhanced lime flue gas desulfurization system of claim 1, further including fines removal means fluidically interposed between said crystallizer-clarifier reaction tank means and said scrubber means for removing fine solids from the fractions produced by the crystallizer-clarifier reaction tank means.

8. The magnesium-enhanced lime flue gas desulfurization system of claim 7, wherein said fines removal means is further fluidically connected to said premix slurry tank means.

* * * * *